3,544,569
PRODUCTION OF SUBSTITUTED 2-MERCAPTO-
4,6-DICHLORO-S-TRIAZINES
Werner Schwarze, Frankfurt am Main, and Wolfgang
Weigert, Offenbach am Main, Germany, assignors to
Deutsche Gold- und Silber-Scheideanstalt vormals
Roessler, Frankfurt am Main, Germany
No Drawing. Filed July 5, 1968, Ser. No. 742,537
Claims priority, application Germany, July 7, 1967,
D 53,535; Dec. 30, 1967, D 54,987
Int. Cl. C07d 55/48
U.S. Cl. 260—248         6 Claims

ABSTRACT OF THE DISCLOSURE

Mercapto triazines of the formula

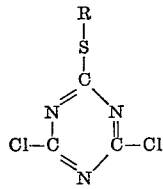

in which R is cycloalkyl, alkenyl, aralkyl or alkyl with 1–18 C atoms which may be substituted by one or more of —OR$^1$, —SR$^1$ or —CN groups in which R$^1$ is lower alkyl are produced by reaction of a mercaptan of the formula R—SH or corresponding mercaptides with cyanuric chloride in a heterogeneous liquid reaction system of water and at least one water immiscible inert organic solvent with thorough mixture of the phases of such system at a temperature and pressure at which such solvent and water are still present in the liquid state, the reactions being carried out in the presence of a hydrochloric acid acceptor when the mercapto reactant is a mercaptan.

Compounds are useful as starting materials for herbicides such as 2-methyl mercapto-4,6-bis-isopropyl-amino-s-triazine. These herbicides can be made from the products of the invention for instance by replacing the chlorine substituents with amino groups.

BACKGROUND OF THE INVENTION

It is known that substituted 2-mercapto-4,6-dichloro-s-triazines can be prepared by reaction of cyanuric chloride with mercaptans in the presence of 2,6-dimethyl-pyridine, 2,4,6-trimethyl-pyridine or 2-methyl-quinoline. If other organic bases are used as HCl acceptors instead of these pyridine or quinoline derivatives or alkali compounds, such as, sodium hydroxide solutions, sodium carbonate or bicarbonate or the corresponding alkaline earth metal compounds, the reaction either cannot be carried out or the yields are very low.

The pyridine and quinoline derivatives described in the literature for this reaction are rather expensive. In order that the process be economically feasible on a technical scale it is necessary to recover the pure anhydrous organic bases from the hydrochlorides produced. This not only is costly but involves losses in material.

It also is known that in the case of the synthesis of 2-methyl-mercapto-4,6-dichloro-s-triazine the reaction must be carried out at temperatures of —25 to —30° C. This again unfavorably influences the costs of the process. If temperatures around 0° C. are used the yield is reduced considerably. (H. Koopman et al., Rec. trav. chim. Pays-Bas 78, 1959, pages 967–980 and DAS 1,220,861.)

DESCRIPTION OF THE INVENTION INCLUDING PREFERRED EMBODIMENTS

According to the invention it was found that substituted 2-mercapto-4,6-dichloro-s-triazines of the formula

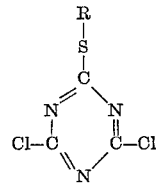

wherein R is cycloalkyl, alkenyl, aralkyl or alkyl of 1 to 18 C atoms which may be substituted by one or more —OR$^1$, —SR$^1$ or —CN groups in which R$^1$ is lower alkyl of 1-4 C atoms can be produced by reacting cyanuric chloride with a mercapto compound, if necessary, in the presence of a basic reacting compound, if the cyanuric chloride is reacted with a mercaptan of the formula R—SH or a corresponding mercaptide in a heterogeneous system of water and at least one water immiscible organic solvent which is inert with respect to the cyanuric chloride, in the case of the mercapto reactant being a mercaptide also in the presence of an HCl acceptor with thorough intermixture of the phases of such system, if desired, under diminished or raised pressure and at a temperature and pressure at which the organic solvent and water are in the liquid state, the aqueous phase being separated off after completion of the reaction and the substituted mercapto triazine being recovered from the organic phase in a manner known per se.

The process according to the invention renders it possible to produce substituted 2-mercapto-4,6-dichloro-s-triazines in high yields, the crude products often already being sufficiently pure that they can be used without further purification and even without intermediate isolation, that is, in the form of the solutions produced.

As contrasted to the previously known processes, it is not necessary to maintain extremely low temperatures in the process according to the invention. While it is also possible to employ low temperatures between about —20° C. and about +10° C., this involves an additional expense for cooling as the condensation is strongly exothermic. For this reason alone, it is advantageous to operate in a higher temperature range. In itself the upper temperature limit is not critical as long as the organic solvent or solvent mixture is still present in the liquid state. This, for example, can be accomplished at higher temperatures with higher pressures. It is, for example, possible to operate at a temperature up to about 400° C. For practical reasons it is preferable to use temperatures between about 10° and 200° C., the range between about 20° and about 50° C. being particularly suitable.

The process according to the invention, as is self-evident, can be carried out using equimolecular quantities of the starting materials. However, it is of advantage that it also can be carried out with practically any desirable excess of any of the reaction partners. This renders it unnecessary to provide for exact dosage of the reaction partners. For instance, it may be expedient, for example, to use a 5 to 25% excess of mercaptan. The excess reaction partners can be removed and recovered by known measures, such as, for example, distillation or sublimation and when the process is carried out continuously they can be recycled to the process.

Illustrative examples of solvents suitable for the process according to the invention are as follows: benzene, toluene, xylene, mono-, di- and tri-chlorobenzene, nitrobenzene, anisole, pentane, hexane, cyclohexane, dibutyl-ether, chlorinated hydrocarbons, such as, methylene chloride, chloroform and carbon tetrachloride, ether, aliphatic, aromatic, araliphatic hydrocarbons, tolunitrile, succinic acid dimethyl ester, acetophenone, tetrahydro naphthalene and similar solvents. Mixtures thereof also can be used. It is advantageous to employ solvents whose boiling point is the same as that of cyanuric chloride so that excess cyanuric chloride and the solvent can be distilled off simultaneously. Tolunitrile, succinic acid dimethyl ester, 1,2,4-trichlorobenzene or a mixture of $C_6$ to $C_9$ alkylated benzenes are suited for this purpose.

In carrying out the process according to the invention, when the mercapto compound used is a mercaptan, the cyanuric chloride and mercaptan are advantageously first dissolved or suspended in the organic solvent or solvent mixture and the inorganic hydrogen chloride acceptor added thereto in the form of an aqueous solution.

The hydroxides, carbonates and bicarbonates of the alkali metals and alkaline earth metals come into question as inorganic hydrogen chloride acceptors. Sodium and potassium hydroxide, however, are preferably used. Such acceptors can be used in almost any desired quantity but preferably are employed in equimolecular quantities. The use of a slight excess, for example, up to about 1%, is of advantage. The acceptors are used in the form of their aqueous solutions. It is not necessary that they be employed in the form of highly concentrated solutions. In all instances concentrations below 50% suffice. In general 4 to 5 normal solutions are employed.

According to the other embodiment of the process according to the invention in which the mercapto compound used is a mercaptide, it is possible either to dissolve or suspend both the mercaptide and the cyanuric chloride in the organic solvent or solvent mixture and then add water thereto or only dissolve or suspend the cyanuric chloride in the organic phase and add the mercaptide thereto in the form of an aqueous solution. When mercaptides are used as the starting mercapto compound it is not necessary to use hydrogen chloride acceptors.

The mercaptides employed can be those of monovalent or of multivalent metals. Examples of suitable mercaptides, for instance, are silver, mercury, zinc and lead mercaptides and above all the alkali metal mercaptides which are preferably employed.

In the process according to the invention the cyanuric chloride as well as the mercaptan employed as starting mercapto compound and the substituted 2-mercapto-4,6-dichloro-s-triazine produced remain dissolved in the organic solvent and the neutralization of the HCl takes place at the boundary surface between the organic solvent and the water. Consequently a two phase reaction is involved, in which the velocity of the reaction depends upon the rules applicable to heterogeneous systems. For example, the velocity of diffusion, the viscosity of the organic solvent, the state of the surface of both phases and the like are of significance. For this reason it is necessary to provide for thorough mixture of the phases which, for example, can be obtained by vigorous stirring or other turbulence producing means, such as, for example, by passage of air or inert gases through the reaction mixture or shaking. The velocity of the reaction can be accelerated by special selection of a solvent with a low viscosity, such as, for example, methylene chloride, ether or toluene. Conversely, solvents with a higher viscosity, such as, the higher alkyl benzenes, the tetrachloro ethers and the like decrease the velocity of the reaction.

As, as is known, cyanuric chloride can be hydrolysed to hydroxy triazines in alkaline mediums, it is advisable when operating at low temperature not to operate at a pH much in excess of 8 in order that high yields and high purity be achieved. When the reaction is carried out at higher temperatures, for example, between 30 and 35° C., the velocity of the reaction is already so high that it is not necessary to control the pH of the solution exactly. A pH of 8 can be exceeded for a short period of time without danger of hydrolysis of the cyanuric chloride or the 2-mercapto-4,6-dichloro-s-triazine.

The processing of the reaction mixture can be carried out using known procedures in that after neutralization and separating off the aqueous phase, then the organic phase is dried and the solvent removed. The residue is the desired substituted 2-mercapto - 4,6 - dichloro-s-triazine which often is produced in almost quantitative yield and is of high purity. A fine purification can be achieved by simple vacuum distillation.

As already indicated, the reaction can be carried out continuously. In such instance, stoichiometric or other selected mixtures of cyanuric chloride and the mercaptan in an inert organic solvent or suspension medium are continuously supplied to the reaction vessel over appropriate metering devices and allowed to react with the desired quantity of an aqueous solution of the HCl acceptor, continuously withdrawing the resultant heterogeneous mixture, removing the aqueous phase, then drying and processing the organic phase. As the condensation is strongly exothermic, heat must be continuously withdrawn. Many known means are available in the art for effecting such continuous heat removal.

The compounds which are produced by the process according to the invention are useful as starting materials for herbicides, for instance, by replacing the chlorine substituents with amino groups in a known manner. For example, they can serve for the production of known herbicides such as, for example, 2-methyl mercapto-4,6-bis - isopropyl - amino-s-triazine, 2-methyl mercapto-4-ethyl-amino - 6 - isopropyl-amino-s-triazine or 2-methyl mercapto-4-isopropyl-amino-6-γ-methoxypropyl amino-s-triazine.

The following examples will serve to illustrate the process according to the invention.

EXAMPLE 1

184.5 g. of cyanuric chloride were suspended in 1 liter of toluene and cooled to 0° C. and 53 g. of methyl mercaptan added thereto at this temperature. Then a solution of 40.1 g. of NaOH in 200 ml. of $H_2O$ was gradually added thereto while stirring vigorously in such a way that the temperature of the reaction mixture did not rise above +2° C. and that the pH of the solution was maintained between 7.5 and 8. The reaction ended after about 60 minutes. The lower aqueous layer was separated off and the toluene solution dried with $CaCl_2$, filtered and boiled down under vacuum (50–60° C./12 torr). A colorless oil remained as the residue which crystallized on cooling. Yield 194 g. crude product; melting point 51° C.

The crude product was given a fine purification by vacuum distillation over a 1 meter Vigreux column. The 2-methyl mercapto-4,6-dichloro-triazine produced boils at 125–127° C. at 12 torr. Yield 167.2 g.=85.3% of theory.

EXAMPLE 2

184.5 g. of cyanuric chloride and 65 g. of ethyl mercaptan were added to 1 liter of anisole. The mixture was cooled to 0° C. and treated at this temperature as described in Example 1 with 202 ml. of an aqueous 5 N KOH solution. Upon processing, 197.3 g. of 2-ethyl mercapto-4,6-dichloro-s-triazine, a light yellow oil, of a boiling point of 86–88° C. at 0.3 torr were obtained. Yield 93.9% of theory.

EXAMPLE 3

184.5 g. of cyanuric chloride were introduced into 1 liter of chloroform and 148 g. of octyl mercaptan added thereto. The mixture was cooled to 0° C. and treated at this temperature as described in Example 1 with 202 ml. of 5 N NaOH. Upon processing 284.4 g. of 2-n-octyl mercapto-4,6-dichloro-s-triazine of a boiling point of 135–136° C. at 0.1 torr were obtained as a light yellow oil. Yield 96.7% of theory.

EXAMPLE 4

184.5 g. of cyanuric chloride were introduced into 1 liter of dichlorobenzene and 77 g. of allyl mercaptan added thereto. The mixture was cooled to 0° C. and then treated as described in Example 1 with a solution of 53.5 g. of sodium carbonate in 200 ml. of $H_2O$. 203.4 g. of 2-allyl mercapto-4,6-dichloro-s-triazine of a boiling point of 110–113° C. at 1.3 torr were obtained as a light yellow oil. Yield 91.5% of theory.

EXAMPLE 5

184.5 g. of cyanuric chloride were introduced into 1,500 ml. of dibutyl ether and 130.2 g. of benzyl mercaptan added thereto. The mixture was cooled to 0° C. Then a solution of 40.4 g. of NaOH in 250 ml. of $H_2O$ were added while stirring vigorously. The reaction was completed in 2 hours. The reaction mixture was processed in the same manner as that of Example 1. The product was a light yellow oil of a boiling point of 149–152° C. at 0.3 torr. Yield 248.3 g.=91.3% of theory.

EXAMPLE 6

184.5 g. of cyanuric chloride and 121 g. of cyclohexyl mercaptan were dissolved in 1.5 liters of carbon tetrachloride and the solution cooled to 0° C. At this temperature 205 ml. of a 5 N NaOH were gradually added over a period of one hour while stirring vigorously. The mixture was of neutral reaction. The aqueous layer was removed and the $CCl_4$ solution dried with $Na_2SO_4$. The $CCl_4$ was distilled off and the 2-cyclohexyl mercaptan product vacuum distilled at 133–135° C. at 0.1 torr. Yield 230.4 g.=87.3% of theory.

EXAMPLE 7

184.5 g. of cyanuric chloride were dissolved in 1,400 ml. of chloroform and 258 g. of hexadecyl mercaptan added thereto. Then a solution of 40.5 g. of NaOH in 200 ml. of water were added thereto over a period of one hour at 0° C. while stirring vigorously. The reaction product was processed as described above. The crude product (401 g.) soon crystallized completely in the form of white crystals. Its melting point was 55° C. Yield 99% of theory.

*Analysis.*—Calculated for $C_{19}H_{33}N_3Cl_2S$ (percent): C, 56.2; H, 8.1; N, 10.3; S, 7.9; Cl, 17.5. Found (percent): C, 56.3; H, 8.0; N, 10.4; S, 7.9; Cl, 17.4.

EXAMPLE 8

Cyanuric chloride, methyl mercaptan and aqueous 5 normal NaOH were reacted with each other at 0° C. and 30° C. 1000 ml. of toluene were used as the solvent. A series of tests were set up in which the molar ratio of the reaction components was varied and the yield of 2-methyl mercapto-4,6-dichloro-s-triazine determined.

The results are tabulated below:

| Cyanuric chloride, mol: | $CH_3SH$, mol | NaOH, mol | Temp., ° C. | Cyanuric chloride conversion, mol | Yield[1] percent |
|---|---|---|---|---|---|
| 1 | 0.5 | 0.5 | 0 | 0.515 | 93.2 |
|   |     |     | 30 | 0.520 | 94.1 |
| 1 | 0.6 | 0.6 | 0 | 0.595 | 93.3 |
|   |     |     | 30 | 0.621 | 93.9 |
| 1 | 0.7 | 0.7 | 0 | 0.705 | 93.4 |
|   |     |     | 30 | 0.71 | 92.7 |
| 1 | 0.8 | 0.8 | 0 | 0.758 | 92.7 |
|   |     |     | 30 | 0.771 | 92.4 |
| 1 | 0.9 | 0.9 | 0 | 0.817 | 84.5 |
|   |     |     | 30 | 0.822 | 90.4 |

[1] Based on cyanuric chloride.

EXAMPLE 9

184.5 g. of cyanuric chloride were dissolved in 1 liter of methylene chloride in a 2 liter round flask provided with a stirrer. 700 ml. of an aqueous solution of 70 g. of sodium methyl mercaptan were then run in at a temperature of 20–25° C. while stirring vigorously. The reaction was completed in 10 minutes.

The methylene chloride layer was separated off, dried and freed from the solvent by vacuum distillation. The crystallized residue was then vacuum distilled. After a first running of 11.82 g. of cyanuric chloride, corresponding to 6.4% of the starting quantity, the 2-methyl mercapto-4,6-dichloro-s-triazine distilled over at 125–127° C. at 12 torr. The yield based on cyanuric chloride converted was 155.8 g. or 85.2% of theory.

EXAMPLE 10

184.5 g. of cyanuric chloride and 500 ml. of toluene were introduced into a 1 liter flask and the mixture heated to boiling. Then a solution of 90.4 g. of potassium methyl mercaptide in 400 ml. of $H_2O$ were added gradually while stirring. During such addition the mixture boiled lightly. The reaction was completed in 5 minutes. After cooling down the organic phase was processed in a manner analogous to that of Example 9. 33.1 g. of cyanuric chloride (17.9% of that supplied) were recovered. 141.3 g. of 2-methyl mercapto-4,6-dichloro-s-triazine distilled over at 125–127° C. at 12 torr, corresponding to a yield of 87.8% based on the cyanuric chloride converted.

EXAMPLE 11

184.5 g. of cyanuric chloride were dissolved in 500 ml. of $CCl_4$ and the solution heated to boiling under reflux (78° C.). Then 53 g. of methyl mercaptan were injected from a gas bottle over a rotameter into this solution at such temperature within a period of 10 minutes. At the same time a solution of 42 g. of NaOH in 200 ml. of $H_2O$ were added during the same ten minute period. The reaction proceeded instantaneously.

Upon the usual processing 41.3 g. of cyanuric chloride (22.4% of that supplied) and 135.5 g. of 2-methyl mercapto-4,6-dichloro-s-triazine were recovered. The yield on cyanuric chloride converted was 89.7%.

EXAMPLE 12

184.5 g. of cyanuric chloride were dissolved in 1 liter of chloroform and 152 g. of $(CH_3S)_2Pb$ were added thereto. Then 1 liter of water was added to the mixture at 20° C. with vigorous stirring. The lead methyl mercaptide slowly went into solution. The reaction was completed in 3 hours.

Upon the usual procesing, 176 g. of 2-methyl mercapto-4,6-dichloro-s-triazine were recovered. The yield was 89.7% of theory.

EXAMPLE 13

A solution of 184.5 g. of cyanuric chloride and 53 g. of methyl mercaptan in methylene chloride was prepared and heated in an autoclave to 60° C. A solution of 40 g. of NaOH in 200 ml. of water was pumped in. The temperature within the autoclave was maintained at 60° C. with exterior cooling. The reaction was completed in 10 minutes. After opening the autoclave the methylene chloride solution was separated off and processed. 14.3 g. of cyanuric chloride (7.7% of that supplied) were recovered. 164 g. (90.5% of theory) of 2-methyl mercapto-4,6-dichloro-s-triazine of a boiling point of 125–127° C. at 12 torr were obtained as the main product.

EXAMPLE 14

A warm solution (40° C.) of 9.225 kg. of cyanuric chloride in 100 liters of 1,2,4-trichlorobenzene was prepared. 10 liters per hour of such solution together with 264 g. of methyl mercaptan per hour, which was taken liquid from a steel bottle and measured with the aid of a rotameter, as well as 2 liters per hour of a 10% aqueous NaOH solution were run into a reactor. The heat of reaction was withdrawn by a heat exchange while stirring the mixture. The phases were then continuously separated and the trichlorobenzene solution freed of methyl mercaptan at 50° C. The dry solution was then continuously freed of cyanuric chloride and solvent under vacuum and the 2-methyl mercapto product distilled over at 110–115° C. at 12 torr. Fine distillation of the 2-methyl mercapto-4,6-dichloro-s-triazine was effected in a second column. Cyanuric chloride supplied per hour 922.5 g., cyanuric chloride recovered per hour 91.4 g. (9.9%). Yield 793 g.=90.5% of theory.

We claim:

1. A method for the production of a substituted 2-mercapto-4,6-dichloro-s-triazine of the formula

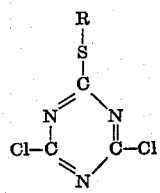

wherein R is selected from the group consisting of cycloalkyl, alkenyl, aralkyl and alkyl of 1 to 18 carbon atoms and cycloalkyl, alkenyl, aralykyl and alkyl of 1 to 18 carbon atoms substituted with at least one substituent selected from the group consisting of —CN, —OR$^1$ and —SR$^1$ wherein R$^1$ is alkyl of 1 to 4 carbon atoms which comprises reacting a mixture selected from the group of a mixture of a mercaptan of the formula R—SH wherein R has the same significance and cyanuric chloride in contact with an inorganic hydrogen chloride acceptor and a mixture of a mercaptide of such a mercaptan and cyanuric chloride in a hererogeneous liquid system of water and at least one water immiscible organic solvent inert with respect to cyanuric chloride while effecting thorough intermixing of the phases at a temperature below the boiling temperature of the organic solvent and water at the pressure employed, separating off the aqueous phase and recovering the substituted 2-mercapto-4,6-dichloro-s-triazine.

2. The process of claim 1 in which the mercapto reactant is a mercaptan and the cyanuric chloride and mercaptan are mixed with the organic solvent and the hydrogen chloride acceptor is added to such mixture in the form of an aqueous solution.

3. The process of claim 1 in which the mercapto reactant is a mercaptide and the cyanuric chloride and mercaptide are mixed with the organic solvent and water added to such mixture.

4. The process of claim 1 in which the mercapto reactant is a mercaptide and the cyanuric chloride is mixed with the organic solvent and a mixture of water and mercaptide is added to such first mixture.

5. The process of claim 1 in which the reaction is carried out at a temperature between 0° C. and +200° C.

6. The process of claim 1 in which the reaction is carried out at a temperature between +20° C. and +50° C.

References Cited

UNITED STATES PATENTS

| 3,250,772 | 5/1966 | Dexter et al. | 260—248 |
| 3,305,551 | 2/1967 | Picklesimer et al. | 260—248 |
| 3,316,263 | 4/1967 | Ross et al. | 260—248 |

JOHN D. RANDOLPH, Primary Examiner

J. M. FORD, Assistant Examiner

U.S. Cl. X.R.

71—93